(12) United States Patent
Glomb et al.

(10) Patent No.: US 9,181,495 B2
(45) Date of Patent: Nov. 10, 2015

(54) CONVECTION ZONE OF A CRACKING FURNACE

(71) Applicant: Linde Aktiengesellschaft, Munich (DE)

(72) Inventors: Stefan Glomb, Munich (DE); Robert Stegemann, Munich (DE); Gunther Schmidt, Deisenhofen (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 23 days.

(21) Appl. No.: 13/863,418

(22) Filed: Apr. 16, 2013

(65) Prior Publication Data
US 2013/0274531 A1    Oct. 17, 2013

(30) Foreign Application Priority Data

Apr. 17, 2012   (DE) .................... 10 2012 008 038

(51) Int. Cl.
| | |
|---|---|
| *C10G 9/14* | (2006.01) |
| *C10G 9/36* | (2006.01) |
| *C10G 9/38* | (2006.01) |
| *B29C 43/36* | (2006.01) |
| *C10G 9/20* | (2006.01) |
| *F28D 21/00* | (2006.01) |

(52) U.S. Cl.
CPC . *C10G 9/38* (2013.01); *B29C 43/36* (2013.01); *C10G 9/20* (2013.01); *C10G 9/36* (2013.01); *F28D 21/001* (2013.01); *F28D 2021/0022* (2013.01)

(58) Field of Classification Search
CPC ..................................... C10G 9/14; C10G 9/36
See application file for complete search history.

(56) References Cited

U.S. PATENT DOCUMENTS

| | | | | |
|---|---|---|---|---|
| 4,361,478 | A * | 11/1982 | Gengler et al. ............... | 208/130 |
| 4,479,869 | A * | 10/1984 | Petterson et al. ............. | 208/130 |
| 7,977,524 | B2 | 7/2011 | McCoy et al. | |
| 8,398,846 | B2 | 3/2013 | Overwater et al. | |
| 2008/0135451 | A1* | 6/2008 | Overwater et al. .......... | 208/125 |
| 2008/0207974 | A1 | 8/2008 | McCoy et al. | |
| 2009/0301935 | A1 | 12/2009 | Spicer et al. | |

FOREIGN PATENT DOCUMENTS

| | | |
|---|---|---|
| DE | 2830824 | 1/1980 |
| EP | 0499897 | 8/1992 |
| EP | 1683850 A1 | 7/2006 |

OTHER PUBLICATIONS

English Bibliographic Data for DE2830824A1 dated Jan. 24, 1980.
English Translation of Abstract for EP0499897A1 dated Aug. 26, 1992.
European Search Report for corresponding patent application EP 12005619 dated Jan. 31, 2013, (pp. 1 and 2 only).

\* cited by examiner

*Primary Examiner* — Randy Boyer
(74) *Attorney, Agent, or Firm* — Millen, White, Zelano, Branigan, P.C.

(57) ABSTRACT

The invention relates to a process for cracking a hydrocarbon-containing feed in a cracking furnace. A plurality of heat exchangers are arranged in the convection zone of the cracking furnace to utilize the heat of flue gas formed in the radiation zone by combustion. Depending on the type and state of matter of the hydrocarbon-containing feed, flow occurs through the heat exchangers to achieve, independently of the type and state of matter of the hydrocarbon-containing feed, an exit temperature of the flue gas in the range from 80° C. to 150° C.

8 Claims, 6 Drawing Sheets

CONVECTION ZONE OF A CRACKING FURNACE

SUMMARY OF THE INVENTION

The invention relates to a process for preparing hydrocarbons by means of thermal cracking of a hydrocarbon-containing feed in a cracking furnace,
  wherein the cracking furnace has a radiation zone and a convection zone,
  the thermal cracking of the hydrocarbon-containing feed is effected in the radiation zone and
  the flue gas from the radiation zone is utilized in the convection zone as heat transfer medium for preheating various starting materials,
  the hydrocarbon-containing feed is preheated and/or vaporized by means of at least one heat exchanger arranged in the convection zone and
  boiler feed water is preheated and/or vaporized by means of at least one heat exchanger arranged in the convection zone,
and also a plant of this type for producing hydrocarbons.

To prepare hydrocarbons by means of thermal cracking (pyrolysis), the relatively long-chain hydrocarbons of the hydrocarbon-containing starting material are thermally cracked to form shorter-chain hydrocarbon products. For this purpose, the hydrocarbon-containing feed is preheated and/or vaporized in the convection zone and fed into the cracking tubes of the radiation zone of a cracking furnace to effect cracking.

The radiation zone of the cracking furnace is fired by means of burners which heat the mixture of hydrocarbon-containing feed and diluent steam which has been preheated in the convection zone further to the reaction temperature in the cracking tubes. Heat transfer occurs mainly by radiation, with a cracking gas being formed by thermal cracking at process temperatures of 500-900° C. The cracking gas is essentially a mixture of, inter alia, n-paraffins, i-paraffins, olefins, diolefins, acetylene, naphthenes, aromatics, methane, hydrogen, etc.

The firing of the tubes of the radiation zone by means of the burners produces a hot flue gas. This is discharged from the cracking furnace via the convection zone into the atmosphere. Here, the hot flue gas is utilized as heat transfer medium in the convection zone. The convection zone of such a plant therefore has at least one heat exchanger for preheating and/or vaporizing the hydrocarbon-containing feed and usually at least one heat exchanger for superheating diluent steam and also at least one heat exchanger for heating and/or vaporizing boiler feed water. When the thermal energy of the flue gas is exploited well, the flue gas leaves the convection zone at a temperature of less than 150° C.

The hydrocarbon-containing feed which is thermally cracked to form shorter-chain hydrogens in the cracking furnace is available in essentially two states of matter and thus typically corresponding compositions. This can be, for example, gaseous feeds such as mainly ethane, propane or liquid feeds such as mainly naphtha, kerosene or diesel.

For cracking, i.e. before entry into the cracking tubes of the radiation zone, the respective hydrocarbon-containing feed has to be mixed with diluent steam and the mixture has to be present in the gaseous phase. Thus, the convection zone has to meet different requirements for the different states of matter of the hydrocarbon-containing feed. In the case of a gaseous hydrocarbon-containing feed, this merely has to be preheated in the convection zone. In order to process a liquid hydrocarbon-containing feed, sufficient heat transfer area has to be available in the convection zone in order to not only preheat the hydrocarbon-containing feed but also to convert it into the gaseous state.

According to the prior art, the design of the convection zone of a cracking furnace, in particular the heat exchangers to be installed and the associated heat transfer area and also the arrangement of the bundles through which flow occurs in the convection zone, is therefore matched to the respective hydrocarbon-containing feed and its state of matter. Here, the exit temperature of the flue gas and thus the overall thermal efficiency of the cracking furnace and also the entry temperature of the mixture of hydrocarbon-containing feed and diluent steam into the radiation zone are optimized individually.

Since in the case of a gaseous hydrocarbon-containing feed, this only has to be preheated, a substantially greater quantity of heat from the flue gas is available for other tasks in this case. For this reason, a plurality of heat exchangers or a larger heat transfer area, which serve for heating and/or vaporizing boiler feed water and/or generating superheated high-pressure steam, are additionally arranged in the convection zone of a cracking furnace as is designed for a gaseous hydrocarbon-containing feed.

In the case of a liquid hydrocarbon-containing feed, a larger quantity of heat energy is required for heating and vaporization of the feed. The convection zone of a cracking furnace as is designed for a liquid hydrocarbon-containing feed therefore has significantly fewer heat exchangers or a smaller heat transfer area for heating and/or vaporizing boiler feed water and/or generating superheated high-pressure steam.

These design differences in the cracking furnaces for different types and states of matter of the hydrocarbon-containing feed lead, in the operation of a cracking furnace having an identical way of carrying out the process in the convection zone for different hydrocarbon feeds, to compromises in respect of energy efficiency and desired process engineering operating conditions, so that operation of the cracking furnace is not economically optimized for each hydrocarbon feed.

A cracking furnace which is designed primarily for a gaseous hydrocarbon-containing feed would not be optimized in process engineering terms for operation using a liquid hydrocarbon-containing feed since the latter cannot be heated and/or vaporized sufficiently in the convection zone because the heat transfer area is typically made too small.

On the other hand, if a cracking furnace designed for a liquid hydrocarbon-containing feed is operated using a gaseous hydrocarbon-containing feed, this operation is not optimized in process engineering terms and is less economical since the total thermal energy of the hot flue gas cannot be recovered even approximately in energy terms. In such a case, the flue gas leaves the convection zone of the cracking furnace at a substantially higher temperature than in the case of operation using a liquid hydrocarbon-containing feed, so that the resulting flue gas temperatures are then typically greater than 200° C.

It is one object of the present invention to configure a process or an apparatus, of the type mentioned at the above, in such a way that it is possible to react flexibly to changing hydrocarbon-containing feeds, in particular various states of matter (gaseous, liquid).

Thus, an aspect of the invention is to provide a process for cracking a hydrocarbon-containing feed with optimized methods of operating the cracking furnace and corresponding conditions (for example, entry temperature of the mixture of hydrocarbon-containing feed and diluent steam into the radiation zone) and high total thermal efficiencies for changing hydrocarbon feeds.

Upon further study of the specification and appended claims, other objects, aspects and advantages of the invention will become apparent.

These objects are achieved by a process for preparing hydrocarbons by means of thermal cracking of a hydrocarbon-containing feed in a cracking furnace having a convection zone and a radiation zone wherein the temperature of flue gas exiting the convection zone varies, independently of the state of matter of the hydrocarbon-containing feed, in a range of 30° C., and is less than 150° C., streams flowing through heat exchangers in the convection zone are regulated in the process in such a way that, depending on the state of matter of the hydrocarbon-containing feed, for a given state of matter, virtually 100% of the heat transfer area of all heat exchangers in the convection zone participates in heat exchange with the flue gas, during operation with the other state of matter only a prescribed fraction of the heat transfer area of all heat exchangers in the convection zone participates in heat exchange with the flue gas, or the feed stream to at least one heat exchanger in the convection zone is regulated so that the efficiency of heat exchange in this/these heat exchanger(s) decreases.

These objects are achieved by an apparatus for preparing hydrocarbons by means of thermal cracking of a hydrocarbon-containing feed in a cracking furnace having a convection zone and a radiation zone wherein the convection zone is provided with heat exchangers for heating process fluids, such as heating boiler feed water, and at least one feed line to a heat exchanger in the convection zone has a regulating valve or shutoff valve, and the feed line of at least one heat exchanger for heating, e.g., boiler feed water, has a shutoff valve and the feed or discharge line of at least one other heat exchanger for heating, e.g., boiler feed water, has a shutoff valve or a pressure drop element, and the shutoff valve of the feed line to the at least one heat exchanger connects a feed line of the at least one heat exchanger to a feed line of the at least one other heat exchanger.

Further advantageous features and embodiments of the inventive process and apparatus are described herein.

According to the basic concept underlying the invention, the streams in the heat exchangers of the convection zone are regulated in the process in such a way that the temperature of the flue gas on exiting the convection zone varies, independently of the state of matter of the hydrocarbon-containing feed, in a range of 30° C. and is less than 150° C. and the streams in the heat exchangers of the convection zone are regulated in the process in such a way that, depending on the state of matter of the hydrocarbon-containing feed, for a given state of matter, (in particular liquid or gaseous), virtually 100% of the heat transfer area of all heat exchangers in the convection zone participates in heat exchange with the flue gas, during operation with the other state of matter (in particular correspondingly gaseous or liquid) only a prescribed fraction of the heat transfer area of all heat exchangers in the convection zone participates in heat exchange with the flue gas or the feed stream to at least one heat exchanger in the convection zone is regulated so that the efficiency of heat exchange in this/these heat exchanger(s) decreases.

For the purposes of the invention, the convection zone has sufficient heat exchangers for preheating and/or vaporizing the hydrocarbon-containing feed and for heating and/or vaporizing the boiler feed water. However, depending on the state of matter of the hydrocarbon-containing feed, part of the heat transfer area of the heat exchangers does not participate in the heat exchange or is restricted in terms of its effectiveness. In this way, it can be ensured, firstly, that the hydrocarbon-containing feed enters the radiation zone in the gaseous state at a sufficiently high temperature, independently of the state of matter, and at the same time the temperature of the flue gas on exiting the convection zone fluctuates by a maximum of 30° C., independently of the state of matter of the hydrocarbon-containing feed.

To ensure that only a fraction of the heat transfer area of all heat exchangers in the convection zone participates in heat exchange with the flue gas, the streams in the process are regulated as a function of the hydrocarbon-containing feed in such a way that at times no medium flows through particular parts of or the entirety of one or more heat exchangers. It is likewise possible according to the invention for the streams in the process to be regulated in such a way that the efficiency of heat exchangers decreases. This can occur, for example, as a result of countercurrent passage (same flow direction of streams to be heated and/or vaporized and flue gas stream to be cooled) so that the streams conveyed through the heat exchanger have a temperature which is close to or equal to the temperature of the flue gas at the cold end of the respective heat exchanger. As an alternative, the streams conveyed through the heat exchangers generally have a temperature which is close to or the same as the temperature of the flue gas at the position of the heat exchanger.

Expressed more simply, according to the invention, parts of heat exchangers wherein a process stream that is in the other state of matter (e.g., liquid) from the state of matter of the hydrocarbon-containing feed (e.g., gaseous) participates in heat exchange with the flue gas are operated so that they are less efficient when the hydrocarbon-containing feed is in a different state of matter. But, regardless of the state of matter of the hydrocarbon-containing feed, the temperature of the flue gas differs by a maximum of 30° C. on exit from the convection zone.

The temperature of the flue gas at the exit from the convection zone preferably fluctuates by not more than 20° C., particularly preferably by not more than 15° C.

The flue gas preferably has a temperature in the range from 80° C. to 150° C. on exiting the convection zone. A high total thermal efficiency is achieved in this way. The process streams for different hydrocarbon feeds can advantageously be regulated in such a way that the flue gas has a temperature in the range from 80° C. to 150° C. at the end of the convection zone, i.e. at the cold end of the waste heat facility, independently of the type and state of matter of the hydrocarbon-containing feed. Thus, the heat of the flue gas is optimally exploited in all cases.

The flue gas particularly preferably has a temperature in the range from 80° C. to 130° C. on exiting the convection zone.

In a preferred embodiment of the invention, the streams in the heat exchangers in the convection zone are regulated in the process in such a way that in the case of a gaseous hydrocarbon-containing feed, virtually 100% of the total heat transfer area of all heat exchangers in the convection zone participates in heat exchange with the flue gas, while in the case of a liquid hydrocarbon-containing feed, only a fraction of 100% of the heat transfer area of the heat exchangers in the convection zone which do not serve for preheating and/or vaporizing the hydrocarbon-comprising feed participates in heat exchange with the flue gas or the feed stream to at least one heat exchanger in the convection zone which does not serve for preheating and/or vaporizing the hydrocarbon-comprising feed is regulated in such a way that the efficiency of heat exchange of this heat exchanger decreases, where, in particular, virtually 100% of the heat transfer area of the heat exchanger(s) for heating and/or vaporizing the hydrocarbon-containing feed participates, independently of the state of matter of the hydrocarbon-containing feed, in heat exchange with the flue gas and, in particular, the heat exchanger(s) for preheating and/or vaporizing the hydrocarbon-containing feed is/are arranged at the relatively cold end of the convection zone.

For the purposes of the present invention, "virtually 100%" of the heat transfer area is the entire heat transfer area which was provided for the respective process stream in the design of the heat exchanger. If flow no longer occurs through individual passages due to damage during operation or similar occurrences and these passages therefore no longer participate in heat exchange, this is still considered to be virtually 100% of the heat transfer area and not a fraction of 100% of the heat transfer area for the purposes of the invention.

Likewise, a decrease in the efficiency of a heat exchanger and a lower efficiency of the heat exchanger are considered to be equivalent for the purposes of the invention.

In this embodiment of the invention, the heat exchanger(s) for preheating and/or vaporizing the hydrocarbon-containing feed is/are arranged at the relatively cold end, preferably at the cold end, of the convection zone. In this embodiment of the invention, the heat exchangers are designed so that in the case of a gaseous hydrocarbon-containing feed, the entire heat transfer area of all heat exchangers in the convection zone participates in heat exchange with the flue gas. The heat exchanger(s) for heating the hydrocarbon-containing feed withdraw(s) the remainder of the thermal energy from the flue gas, so that the flue gas is cooled to a temperature below 150° C., preferably to a temperature in the range from 80° C. to 150° C., particularly preferably from 80° C. to 130° C.

Regulation is preferably effected by means of regulating valves, shutoff valves or pressure drop elements. A pressure drop element is any fitting which leads to a high pressure drop in a line. Instead of shutoff valves, other fittings giving a high pressure drop in the outflow are thus generally also used advantageously for the purposes of the invention.

In the case of a liquid hydrocarbon-containing feed, more energy has to be supplied to the heat exchangers for preheating and/or vaporizing the hydrocarbon-containing feed than in the case of a gaseous hydrocarbon-containing feed. Essentially, the energy of vaporization has to be additionally supplied to the liquid hydrocarbon-containing feed. To ensure this in the same heat exchanger, the temperature of the flue gas has to be higher, before its heat exchange with the hydrocarbon-containing feed, when the liquid hydrocarbon-containing feed is liquid in comparison to when the hydrocarbon-containing feed is gaseous. In this embodiment of the invention, this is ensured by permitting only a fraction of 100% of the heat transfer area (e.g., less than all of the heat exchangers) which does not serve for preheating and/or vaporizing the hydrocarbon-containing feed to participate in heat exchange with the flue gas, or the feed stream to at least one heat exchanger in the convection zone which does not serve for heating and/or vaporizing the hydrocarbon-containing feed is regulated in such a way that the efficiency of heat exchange in this heat exchanger decreases.

As a result, in each case only that amount of heat which is sufficient for preheating and/or vaporizing the hydrocarbon-containing feed for the cracking reaction is withdrawn from the flue gas before heat exchange with the hydrocarbon-containing feed in this embodiment of the invention.

Expressed more simply, it can be said that in this embodiment of the invention, a large proportion of heat exchange with the hydrocarbon-containing feed occurs at the relatively cold end of the convection zone and only that amount of heat which leaves enough residual heat in the flue gas to heat and/or vaporize the hydrocarbon-containing feed, depending on the state of matter, is previously withdrawn from the flue gas, depending on the state of matter of the hydrocarbon-containing feed. The proportion of heat exchange with the hydrocarbon-containing feed is advantageously altered or matched individually at the relatively cold end of the convection zone.

In this embodiment, in the case of a liquid hydrocarbon-containing feed boiler feed water preferably does not flow through at least one heat exchanger for heating and/or vaporizing boiler feed water through which boiler feed water flows in the case of a gaseous hydrocarbon-containing feed, in particular is bridged or bypassed by means of bypass regulation. Thus, a predetermined number of heat exchangers is available for heating and/or vaporizing boiler feed water. If the hydrocarbon-containing feed is gaseous, all these heat exchangers participate in heat exchange with the flue gas. In the case of a liquid hydrocarbon-containing feed, boiler feed water does not flow through at least one of these heat exchangers for heating and/or vaporizing boiler feed water, but the heat exchanger in question is preferably bypassed by means of bypass regulation. This heat exchanger therefore does not participate in heat exchange with the flue gas. As a result, the temperature of the flue gas automatically increases at the relatively cold end of the waste heat facility before heat exchange with the hydrocarbon-containing feed. The flue gas thus has sufficient thermal energy to preheat and vaporize the liquid hydrocarbon-containing feed.

For the purposes of the invention, bypass regulation is a bypass around the heat exchanger(s) concerned. Bypasses are preferably realized by means of valves for the purposes of the present patent application.

In particular, the at least one heat exchanger can be connected hydrodynamically in series with at least one further heat exchanger arranged in the convection zone. In the case of a liquid hydrocarbon-containing feed, boiler feed water can be conveyed past the at least one heat exchanger and thus merely flow through the at least one further heat exchanger for heating and/or vaporizing boiler feed water. In the case of a gaseous hydrocarbon-containing feed, boiler feed water can flow firstly through the at least one heat exchanger and then through the at least one further heat exchanger for heating and/or vaporizing boiler feed water.

In a further embodiment of the invention, diluent steam for cracking is superheated by means of at least one heat exchanger arranged in the convection zone, with this heat exchanger not participating or participating with lower efficiency in heat exchange with the flue gas as a result of bypass regulation, depending on the state of matter of the hydrocarbon-containing feed. This variant is an alternative embodiment of the embodiment of the invention just indicated.

In another embodiment of the invention, the streams in the heat exchangers in the convection zone are regulated in the process in such a way that in the case of a liquid hydrocarbon-containing feed, virtually 100% of the entire heat transfer area of the heat exchanger(s) for preheating and/or vaporizing the hydrocarbon-containing feed participates in heat exchange with the flue gas, while in the case of a gaseous feed, only a fraction of 100% of the entire heat transfer area of the heat exchanger(s) for preheating and/or vaporizing the hydrocarbon-containing feed participates in heat exchange with the flue gas or the hydrocarbon-containing feed in at least one heat exchanger in the convection zone which serves for preheating and/or vaporizing the hydrocarbon-containing feed is regulated in such a way that the efficiency of heat exchange in this heat exchanger decreases, where, independently of the state of matter of the hydrocarbon-containing feed, virtually 100% of the entire heat transfer area of all other heat exchangers of the convection zone participates in heat exchange and at least one heat exchanger for preheating and/or vaporizing the hydrocarbon-containing feed is arranged at the relatively cold end of the convection zone and at least one heat exchanger for preheating and/or vaporizing the hydrocarbon-containing feed is arranged in a region of relatively high flue gas temperature.

The one heat exchanger for preheating and/or vaporizing the hydrocarbon-containing feed at the relatively cold end of the convection zone can advantageously be arranged directly at the cold end of the convection zone or, for example, at a colder region of the convection zone relative to a hotter region of the convection zone where another at least one heat exchanger for preheating and/or vaporizing the hydrocarbon-containing feed is arranged.

In this embodiment of the invention, at least two heat exchangers are available for preheating and/or vaporizing the hydrocarbon-containing feed. At least one of these heat exchangers is arranged at the relatively cold end of the convection zone and at least another of these heat exchangers is arranged in a region of relatively high flue gas temperature.

In the case of a liquid hydrocarbon-containing feed, virtually 100% of the entire heat transfer area of the heat exchangers for preheating and/or vaporizing the hydrocarbon-containing feed participate in heat exchange with the flue gas in this embodiment of the invention. Since in the case of a gaseous hydrocarbon-containing feed, less heat is required for heating the hydrocarbon-containing feed, in this embodiment either the heat transfer area through which flow occurs is reduced or the process streams are conducted in such a way that the efficiency of one of these heat exchangers for preheating and/or vaporizing the hydrocarbon-containing feed is decreased. Thus, in this embodiment of the invention, too, the process streams are conducted so that, independently of the state of matter of the hydrocarbon-containing feed, an exit temperature of the flue gas from the convection zone which varies only in a range of 30° C. and is below 150° C., preferably in the range from 80° C. to 150° C., particularly preferably from 80° C. to 130° C., is obtained.

In this embodiment of the invention, it is preferred that in the case of a gaseous hydrocarbon-containing feed, this feed is firstly fed into a heat exchanger for preheating and/or vaporizing the hydrocarbon-containing feed at the relatively cold end of the convection zone, where hydrocarbon-containing feed does not flow through at least one of the heat exchangers for preheating and/or vaporizing the hydrocarbon-containing feed in the region of relatively high flue gas temperature, while in the case of a liquid hydrocarbon-containing feed, this feed is firstly fed into at least one heat exchanger for preheating and/or vaporizing the hydrocarbon-containing feed in the region of relatively high flue gas temperature before the hydrocarbon-containing feed passes through the heat exchanger(s) for preheating and/or vaporizing the hydrocarbon-containing feed at the relatively cold end of the convection zone and regulation preferably occurs by means of shutoff valves in the feed lines for the hydrocarbon-containing feed.

In this preferred embodiment of the invention, at least two heat exchangers for preheating and/or vaporizing the hydrocarbon-containing feed are arranged in the convection zone. One of these two heat exchangers is located at the relatively cold end of the convection zone, while at least another of these heat exchangers is arranged in a region of relatively high flue gas temperature.

In the case of a gaseous hydrocarbon-containing feed, this is fed into at least one heat exchanger which serves for preheating and/or vaporizing the hydrocarbon-containing feed and is arranged in the region of the upper end, i.e. at the relatively cold end, of the convection zone. In the case of a gaseous hydrocarbon-containing feed, this does not flow through at least one of the heat exchangers for preheating and/or warming the hydrocarbon-containing feed which is arranged in a region of relatively high flue gas temperature. This heat exchanger therefore does not participate in heat exchange with the flue gas. This ensures that in the case of a gaseous hydrocarbon-containing feed only a fraction of 100% of the entire heat transfer area of the heat exchanger for preheating and/or vaporizing the hydrocarbon-containing feed participates in heat exchange with the flue gas.

In this preferred embodiment of the invention, liquid-carbon-containing feed is firstly fed into at least one of the heat exchangers for preheating and/or vaporizing the hydrocarbon-containing feed which is arranged in a region of relatively high flue gas temperature. After passing through this or these heat exchanger(s), the hydrocarbon-containing feed is fed into at least one heat exchanger for preheating and/or vaporizing the hydrocarbon-containing feed which is arranged at the relatively cold end of the convection zone. As a result, virtually 100% of the heat transfer area of the heat exchangers for preheating and/or vaporizing the hydrocarbon-containing feed participate in heat exchange with the flue gas in the case of a liquid hydrocarbon-containing feed and the liquid hydrocarbon-containing feed is both vaporized and sufficiently preheated. The switching-over between these two operating states using different hydrocarbon-containing feeds is preferably carried out by means of regulating or shutoff valves which are arranged in the feed lines for the hydrocarbon-containing feed into the heat exchangers for preheating and/or vaporizing the hydrocarbon-containing feed.

In another preferred embodiment of this variant, the hydrocarbon-containing feed is, independently of the state of matter, firstly fed into at least one heat exchanger for preheating and/or vaporizing the hydrocarbon-containing feed at the relatively cold end of the convection zone, where in the case of a gaseous hydrocarbon-containing feed, flow does not occur through at least one heat exchanger for preheating and/or vaporizing the hydrocarbon-containing feed in the region of the relatively high flue gas temperature, in particular is bypassed by means of bypass regulation and shutoff valves, through which in the case of a liquid hydrocarbon-containing feed, this feed flows.

In this embodiment of the variant, too, only a fraction of 100% of the heat transfer area of all heat exchangers for preheating and/or vaporizing the hydrocarbon-containing feed participates in heat exchange with the flue gas in the case of a gaseous hydrocarbon-containing feed. In the case of a liquid hydrocarbon-containing feed, virtually the entire heat transfer area of the heat exchangers for preheating and/or vaporizing the hydrocarbon-containing feed is utilized. Specifically, at least one heat exchanger in the region of relatively high flue gas temperature is bypassed by means of bypass regulation and shutoff valves in the case of a gaseous hydrocarbon-containing feed. In the case of a liquid hydrocarbon-containing feed, this passes firstly through the heat exchangers at the relatively cold end of the convection zone and is conveyed from there into the heat exchangers in the region of relatively high flue gas temperature.

The hydrocarbon-containing feed and/or boiler feed water is/are advantageously preheated and/or vaporized uniformly. Preference is thus given to carrying out the same steps for preheating and/or vaporizing the hydrocarbon-containing feed on the total amount of the hydrocarbon-containing feed. However, it is also possible to divide the total amount of hydrocarbon-containing feed into two or more substreams and carry out preheating and/or vaporization according to the invention on only one of the substreams. The same steps for heating and/or vaporizing the boiler feed water are preferably also carried out on the total amount of the boiler feed water. The total amount of boiler feed water can in other cases also be divided into two or more substreams, with heating and/or vaporization according to the invention being carried out on one of the boiler water substreams.

As regards an apparatus, the stated aspects are achieved by a plant for preparing hydrocarbons by means of thermal dissociation of a hydrocarbon-containing feed using a cracking furnace,
    wherein the cracking furnace has a radiation zone and a convection zone
    and the radiation zone has at least one cracking tube suitable for cracking the hydrocarbon-containing feed,
    the radiation zone is heated by firing, forming flue gas,
    the radiation zone has a flow connection for the flue gas to the convection zone,
    the convection zone has at least one heat exchanger which has a feed line for the hydrocarbon-containing feed and a flow connection to at least one cracking tube in the radiation zone,
    the convection zone has at least one heat exchanger which has a feed line for boiler feed water
    and at least one feed line to a heat exchanger has a regulating valve and/or shutoff valve.

In terms of the apparatus, aspects according to the invention are achieved by at least one feed line to at least one heat exchanger having a regulating valve or shutoff valve. This makes it possible to ensure that, depending on the state of matter of the hydrocarbon-containing feed, part of the heat transfer area does not participate in heat exchange or the efficiency of at least one heat exchanger is impaired.

In a preferred embodiment, the feed line of at least one heat exchanger for heating boiler feed water has a shutoff valve and the feed or discharge line of at least one other heat exchanger for heating boiler feed water has a shutoff valve or a pressure drop element (see above). In this embodiment of the invention, at least two heat exchangers for heating boiler feed water are available. Depending on the state of matter of the hydrocarbon-containing feed, all heat exchangers or at least one do/does not participate in heat exchange with the flue gas.

Furthermore, the shutoff valve of the feed line to the at least one heat exchanger preferably connects a boiler feed water feed line of the at least one heat exchanger to a boiler feed water feed line of the other heat exchanger.

Furthermore, the discharge line of the at least one other heat exchanger is preferably hydrodynamically connected to the boiler feed water feed line of the at least one heat exchanger.

Furthermore, in the case where the shutoff valve of the feed line to the at least one heat exchanger is open and the shutoff valve of the feed or discharge line of the at least one other heat exchanger is closed, the at least one other heat exchanger is preferably bridged and no boiler feed water can be conveyed through the at least one other heat exchanger. On the other hand, in the case where the shutoff valve of the feed line to the at least one heat exchanger is closed and the shutoff valve of the feed or discharge line of the at least one other heat exchanger is open, boiler feed water can only be passed through the at least one other heat exchanger and then through the at least one heat exchanger for vaporizing or heating the boiler feed water. Instead of the shutoff valve in the feed or discharge line, a pressure drop element can likewise make the boiler feed water take the above-described flow path. This has the advantage that in the case of a permanently high pressure drop through the pressure drop element, regulation of a corresponding valve can be dispensed with.

The feed line for hydrocarbon-containing feed into at least one heat exchanger advantageously has a shutoff valve. This ensures that, depending on the state of matter, the entire heat transfer area is utilized for preheating and/or vaporizing the hydrocarbon-containing feed or only a fraction thereof is utilized.

It is likewise advantageous for the discharge line for hydrocarbon-containing feed from at least one heat exchanger to have a hydrodynamic connection to at least one further heat exchanger and a shutoff valve. In this embodiment of the invention, the hydrocarbon-containing feed can, depending on the state of matter, flow through more or fewer heat exchangers.

The present invention makes it possible, in particular, to operate a process for preparing hydrocarbons in such a way that, firstly, the heat of the flue gas in the convection zone is optimally utilized and, secondly, it is ensured that the hydrocarbon-containing feed is sufficiently preheated and vaporized in the convection zone independently of the state of matter.

BRIEF DESCRIPTION OF THE DRAWINGS

The invention as well as additional details of the invention are explained in more detail below based on the embodiments shown in the drawings, wherein.

The examples of the invention shown in FIGS. 1 to 6 are process flow diagrams in which a heat exchanger depicted as a rectangle in each case represents one or more heat exchangers but will be described as a heat exchanger. The schematic arrangement of the heat exchangers in the figures corresponds to the arrangement in the convection zone. A heat exchanger arranged at the top in the figures is located at the relatively cold end of the convection zone. Heat exchangers arranged underneath are in regions having a relatively high flue gas temperature. Solid lines in the figures in each case represent flow paths used. The valves arranged therein are accordingly in the open position. Broken lines in the figures represent flow paths through which flow does not occur, with the valves arranged here accordingly being in the closed position. Identical parts of the figures are in each case denoted by the same reference numerals.

Figure 1:
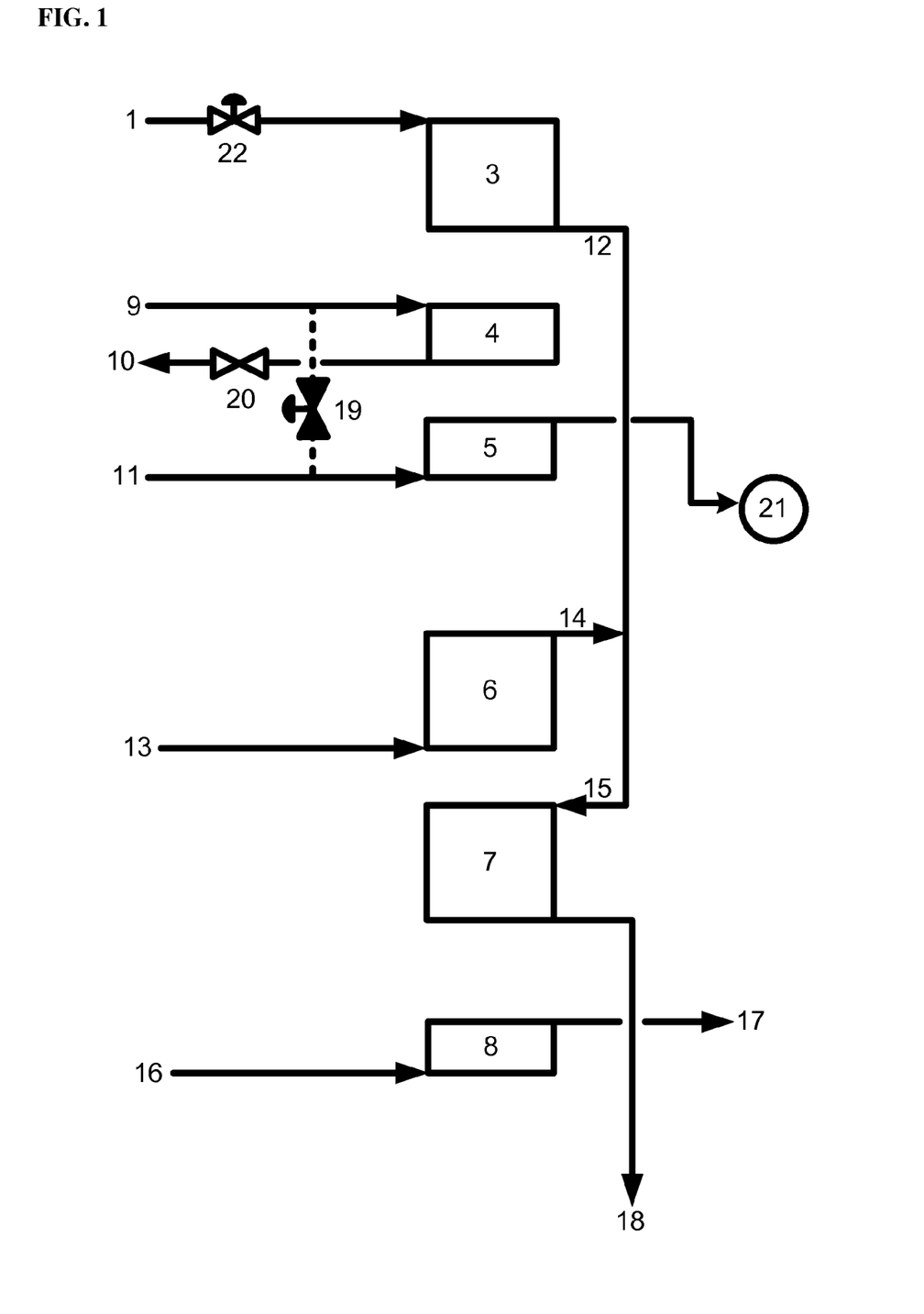
FIG. 1 shows a process flow diagram of an embodiment of the invention in the case of a gaseous hydrocarbon-containing feed
Figure 2:
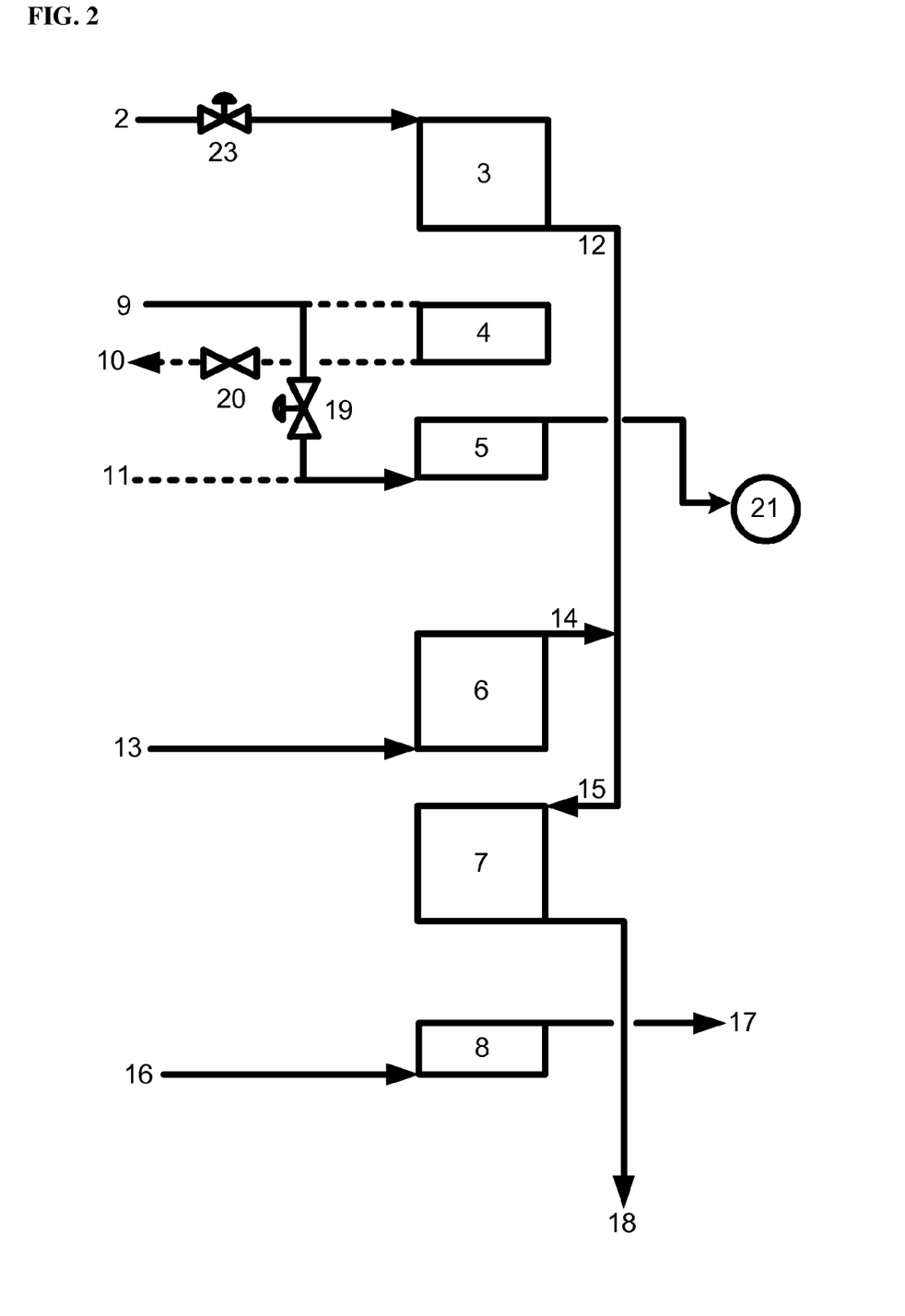
FIG. 2 shows the process example as per FIG. 1 in the case of a liquid hydrocarbon-containing feed

FIGS. 1 and 2 show an embodiment of the invention in which, independently of the state of matter of the hydrocarbon-containing feed, virtually 100% of the heat transfer area of the heat exchanger for preheating and/or vaporizing the hydrocarbon-containing feed participates in heat exchange with the flue gas.

In the process flow diagram shown in FIG. 1, the gaseous hydrocarbon-containing feed 1 is fed into a heat exchanger 3 which is arranged at the relatively cold end of the convection zone. The heated hydrocarbon-containing feed 12 is conveyed from the heat exchanger 3, after addition of superheated steam 14, via a feed line 15 into a further heat exchanger 7 in the region of a relatively high flue gas temperature for further preheating or superheating. The preheated mixture of steam and hydrocarbon-containing feed 18 is conveyed via further optional heat exchangers which are not shown into the cracking tubes in the radiation zone where the actual cracking reaction takes place (not shown).

In this embodiment of the invention, two heat exchangers 4 and 5 for heating and/or vaporizing boiler feed water 9 and 11 and also a heat exchanger 6 for superheating diluent steam 13 are arranged below the first heat exchanger 3 for preheating and/or vaporizing the hydrocarbon-containing feed 1. The boiler feed water 9 is conveyed into the heat exchanger 4 and heated by heat exchange with the flue gas. The valve 20 is in the open position. As a result, flow occurs through the heat exchanger 4 and the heated boiler feed water 10 conveyed from the convection zone for further optional heating (not shown). The heated boiler feed water 10 can then be subsequently further heated and optionally partly vaporized as boiler feed water 11 in a further heat exchanger 5 and introduced as a single- or two-phase mixture into the steam drum 21 outside the convection zone. The valve 19 is in the closed position so that there is no direct flow connection between the two boiler feed water feed lines 9 and 11. However, the discharge line 10 can be hydrodynamically connected to the boiler feed water feed line 11. Instead of a valve 20, an in particular not adjustable pressure drop element which brings about an in particular permanent high pressure drop can also be provided. In this case too, the boiler feed water flows via the pressure drop element 20 when the valve 19 is closed.

Diluent steam 13 is superheated in the heat exchanger 6 which is arranged in a region of relatively high flue gas temperature and is introduced as diluent steam 14 into the hydrocarbon-containing feed 12. The effectiveness of the cracking reaction is improved by the mixture 15 of hydrocarbon-containing feed 12 and superheated steam 14. The convection zone can additionally have further heat exchangers 8 for heating additional feed streams 16, for example saturated high-pressure steam from the steam drum 21. The saturated high-pressure steam 16 can, for example, be superheated in the heat exchangers 8 and used as high-pressure steam 17 in further parts of the plant.

FIG. 2 shows the same example as in FIG. 1, but in this case the process is shown for a liquid hydrocarbon-containing feed 2. In contrast to the gaseous hydrocarbon-containing feed 1, only the heat exchanger 5 for the boiler feed water 9 participates in heat exchange with the flue gas. In this example, the valve 20 is in the closed position and the valve 19 is in the open position. As a result, the boiler feed water 9 does not flow through the heat exchanger 4 but is instead introduced directly as feed 11 into the second heat exchanger 5 and is there optionally partly vaporized. As an alternative, a fitting having a high pressure drop, e.g. said pressure drop element (see above) can also be used instead of the valve 20, so that the boiler feed water flows directly through the heat exchanger 5 when the valve 19 is open because of the lower hydraulic flow resistance. The single- or two-phase mixture is again introduced into the steam drum 21.

As a result of the altered way of carrying out the process in FIG. 2, compared to FIG. 1, only a fraction of 100% of the heat transfer area of the heat exchangers in the convection zone which does not serve for preheating and/or vaporizing the hydrocarbon-containing feed participates in heat exchange with the flue gas. Specifically, flow does not occur through the heat exchanger 4, as a result of which the total heat transfer area for heating and/or vaporizing the boiler feed water is reduced to a fraction of 100%. As a result, heat is withdrawn from the flue gas only by the heat exchanger 5. The heat exchange between the liquid hydrocarbon-containing feed 2 and the flue gas in the heat exchanger 3 takes place with a significantly greater temperature difference. Compared to the way of carrying out the process in the case of a gaseous hydrocarbon-containing feed, the flue gas contains a significantly greater quantity of heat. This can be withdrawn from the flue gas and ensures that enough heat for preheating and/or vaporization is supplied to the liquid hydrocarbon-containing feed 2.

The flue gas at the relatively cold end of the waste heat facility thus has, both in the case of a gaseous hydrocarbon-containing feed 1 and in the case of a liquid hydrocarbon-containing feed 2, a temperature which fluctuates within a range of 30° C. and is below 150° C. The temperature of the flue gas here is preferably in the range from 80° C. to 130° C.

As an alternative, in the example of FIGS. 1 and 2, the shutoff valve 20 can be arranged directly downstream of the heat exchanger 4 and the bypass can end with the shutoff valve 19 in the discharge line 10 downstream of the shutoff valve 20 (not shown).

Figure 3:
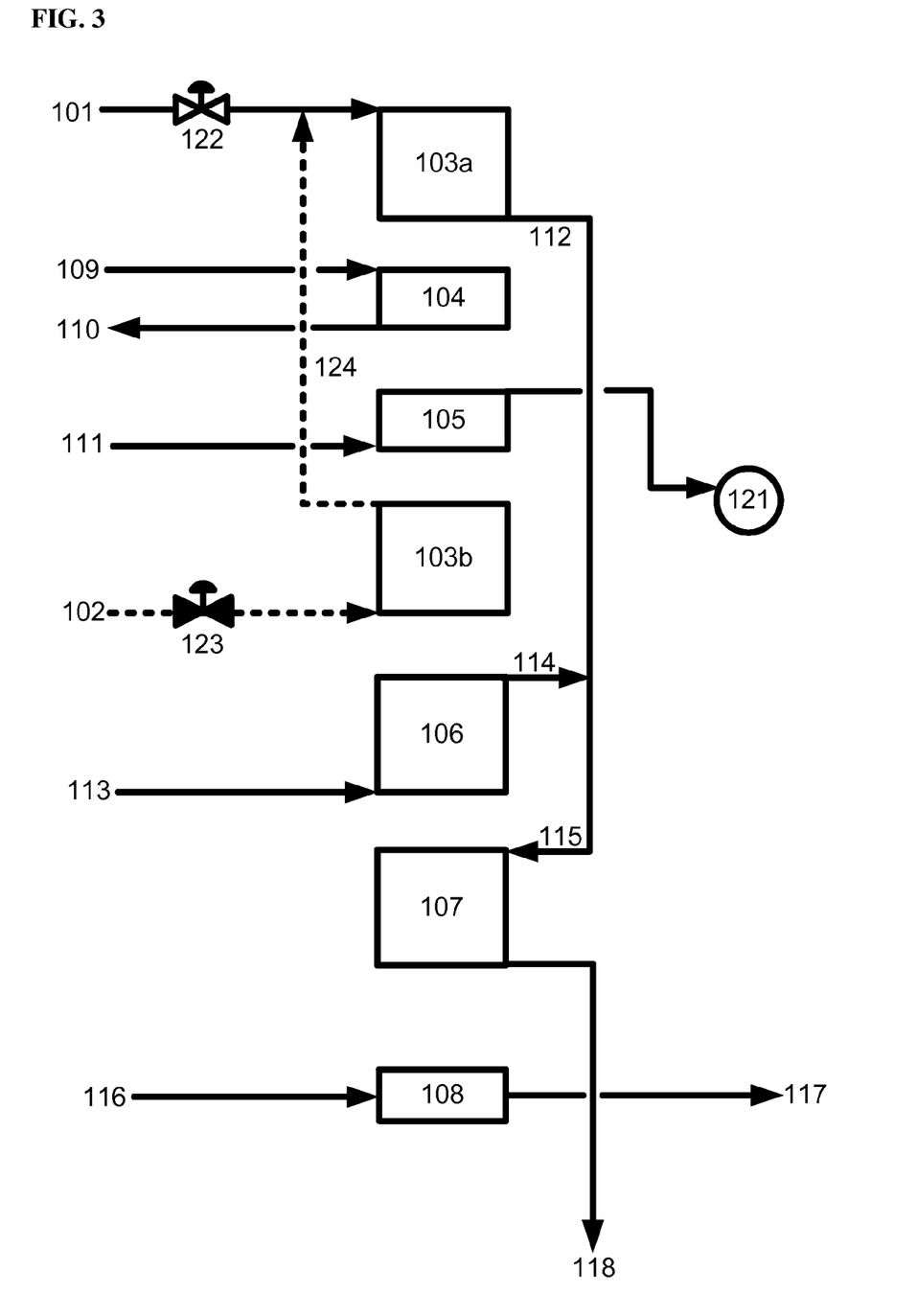
FIG. 3 shows a process flow diagram of a second embodiment of the invention in the case of a gaseous hydrocarbon-containing feed
Figure 4:
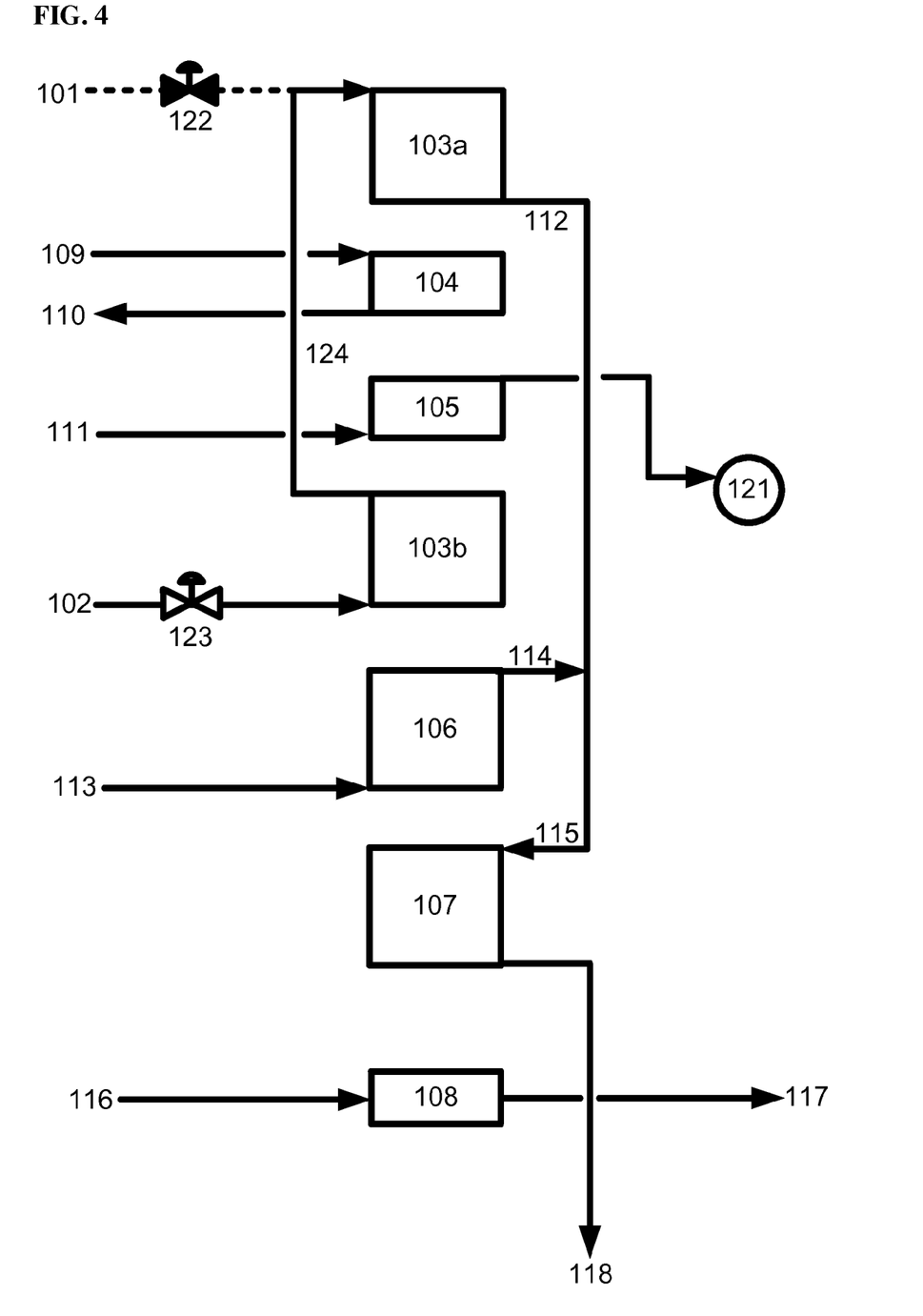
FIG. 4 shows the embodiment of FIG. 3 in the case of a liquid hydrocarbon-containing feed

FIG. 3 and FIG. 4 show variants of an embodiment of the invention, in which, independently of the state of matter of the carbon-containing feed, virtually 100% of the feed transfer area of all heat exchangers which do not serve for preheating and/or vaporizing the hydrocarbon-containing feed participates in heat exchange with the flue gas.

The gaseous hydrocarbon-containing feed 101 is fed into the heat exchanger 103a at the relatively cold end of the convection zone for preheating and/or vaporization. The valve 122 is accordingly in the open position. The heated hydrocarbon-containing feed 112 is conveyed from the heat exchanger 103a, after introduction of diluent steam 114, into a further heat exchanger 107 for preheating or superheating the mixture 115 of carbon-containing feed and diluent steam.

Similarly to the embodiment shown in FIGS. 1 and 2, the convection zone has two further heat exchangers 104 and 105 for heating and/or vaporizing boiler feed water 109 and 111. Similarly to the situation shown in FIGS. 1 and 2, boiler feed water 109 is heated in the heat exchanger 104 and passed to a further use 110. The boiler feed water 111 is heated further and optionally partly vaporized in the heat exchanger 105 and is introduced as a single- or two-phase mixture into the steam drum 121.

The mixture 115 of hydrocarbon-containing feed 101 and superheated diluent steam 114 which has been heated further is, after further preheating or superheating in the heat exchanger 107, fed into the cracking tubes 118 for the cracking reaction.

Similarly to the preceding embodiment, the convection zone has further additional heat exchangers 108 in which, for example, saturated high-pressure steam 116 is superheated and can be used as high-pressure steam 117 in other parts of the plant.

In the embodiment shown in FIGS. 3 and 4, at least two heat exchangers 103a and 103b for preheating and/or vaporizing the hydrocarbon-containing feed are arranged in the convection zone. The heat exchanger 103a is located at the relatively cold end of the convection zone, while the heat exchanger 103b is located in a region of relatively high flue gas temperature.

According to the invention, flow does not occur through the heat exchanger 103b in the case of a gaseous hydrocarbon-containing feed 101 in this embodiment. The valve 123 is accordingly in the closed position. Thus, in this embodiment or the invention, only a fraction of 100% of the heat transfer area of the heat exchangers which serve for preheating and/or vaporizing the hydrocarbon-containing feed participates in heat exchange with the flue gas.

FIG. 4 shows the way of carrying out the process in the embodiment shown in FIG. 3 in the case of a liquid hydrocarbon-containing feed 102. In this case, the liquid hydrocarbon-containing feed 102 is introduced into the heat exchanger 103b in the region of relatively high flue gas temperature. The valve 123 is accordingly in the open position, while the regulating valve 122 is in the closed position. After preheating in the heat exchanger 103b, the preheated liquid hydrocarbon-containing feed 124 is fed into the heat exchanger 103a at the relatively cold end of the convection zone for further preheating. The liquid hydrocarbon-containing feed 112 which has been preheated in this way is, with addition of a superheated diluent steam 114, fed as feed 115 into the heat exchanger 107 for further preheating or superheating.

In this embodiment of the invention, the process streams are conducted so that in the case of a liquid hydrocarbon-containing feed 102 virtually 100% of the heat transfer area of the heat exchangers 103a and 103b is utilized for preheating and/or vaporizing the hydrocarbon-containing feed. The liquid hydrocarbon-containing feed 102 is fed firstly into the heat exchanger 103b which is located at a position having a higher flue gas temperature than the heat exchanger 103a in the convection zone. The exploitation of virtually 100% of the heat transfer area of the heat exchangers for preheating and/or vaporization ensures that even in this case enough heat for preheating and/or vaporization is supplied to the liquid hydrocarbon-containing feed 102.

In the embodiment of the invention shown in FIGS. 3 and 4, the entire heat transfer area of all heat exchangers which do not serve for preheating and/or vaporizing the hydrocarbon-containing feed is utilized, independently of the state of matter of the hydrocarbon-containing feed. In particular, independently of the state of matter of the hydrocarbon-containing feed, the two heat exchangers 104 and 105 participate in heat exchange.

Figure 5:
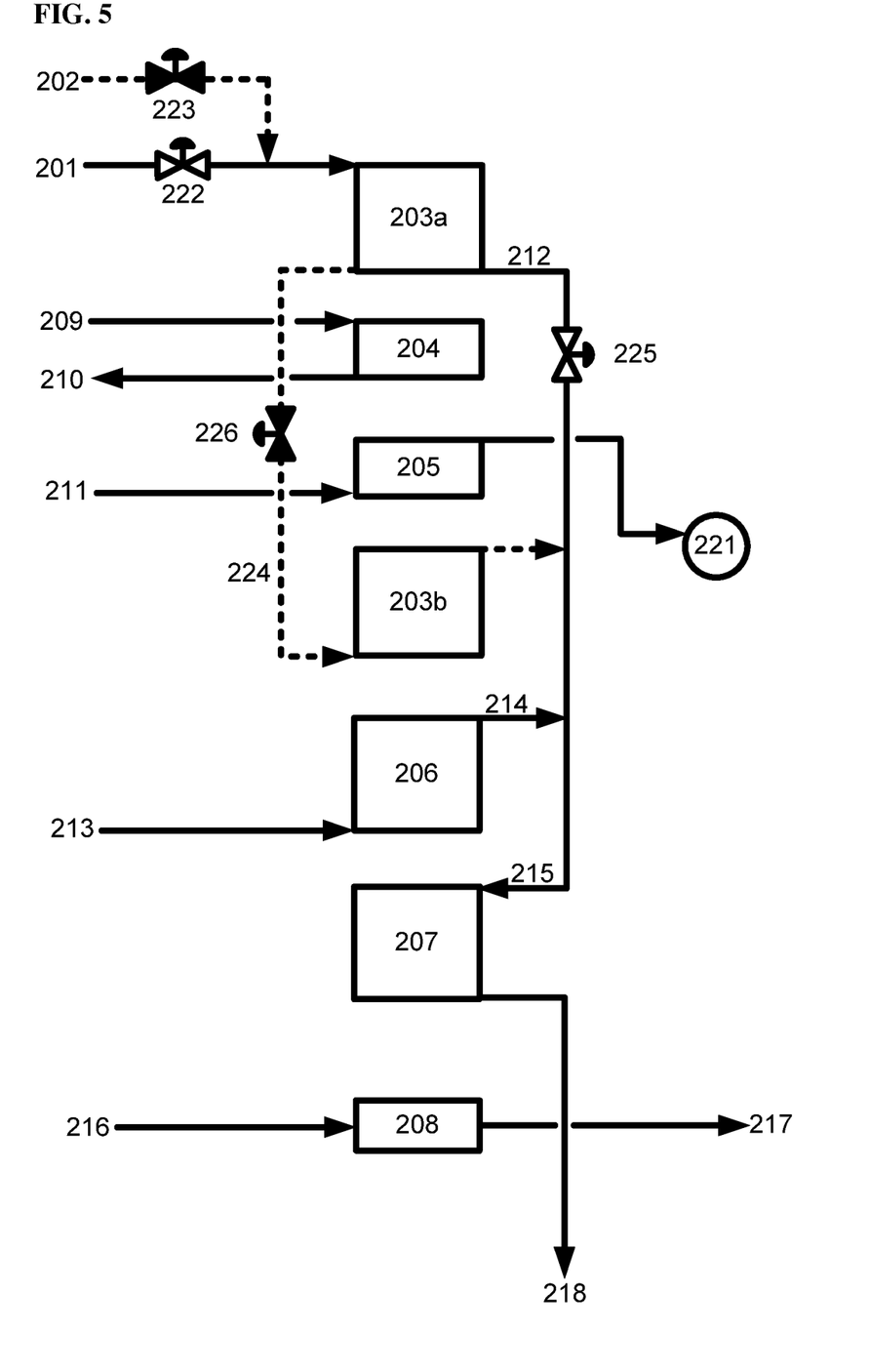
FIG. 5 shows a process flow diagram of a third embodiment of the invention in the case of a gaseous hydrocarbon-containing feed and FIG. 6 shows the example according to FIG. 5 in the case of a liquid hydrocarbon-containing feed.
Figure 6:
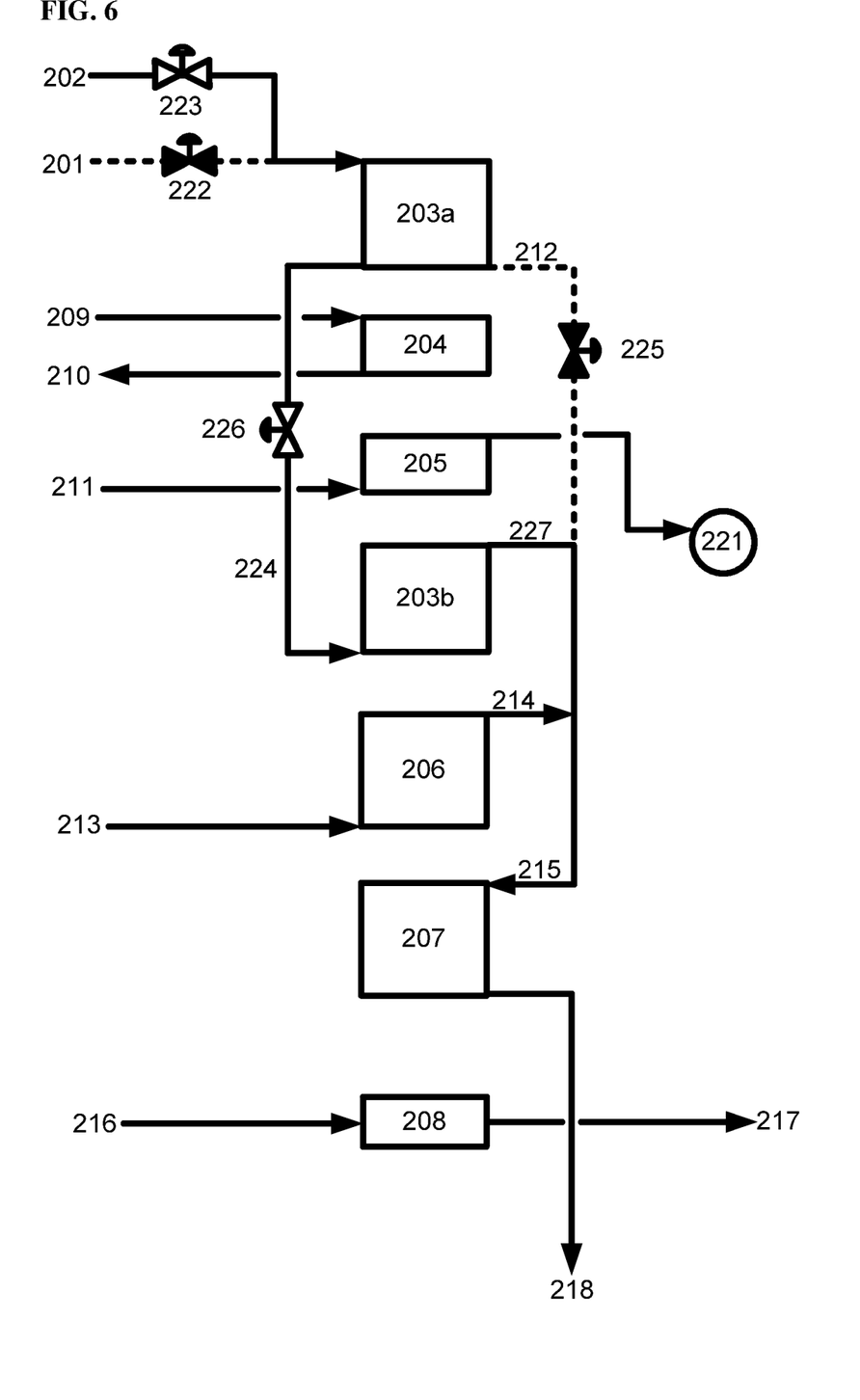

FIGS. 5 and 6 show an alternative embodiment having a similar arrangement of the heat exchangers to the embodiment shown in FIGS. 3 and 4.

Here too, two heat exchangers 203a and 203b are provided for preheating and/or vaporizing the hydrocarbon-containing feed, with the heat exchanger 203a being located at the relatively cold end of the convection zone and the heat exchanger 203b being located at a position of relatively high flue gas temperature in the convection zone. The convection zone likewise has two heat exchangers 204 and 205 for heating and/or vaporizing boiler feed water 209 and 211. In a manner analogous to FIGS. 3 and 4, the heated boiler feed water 210 is used further or fed as single- or two-phase mixture into the steam drum 221. The heat exchanger 206 serves analogously for superheating diluent steam 213 which is mixed as superheated steam 214 into the hydrocarbon-containing feed. The mixture 215 of hydrocarbon-containing feed and superheated steam 214 is introduced into the heat exchanger 207 for further preheating or superheating. Likewise, a plurality of optional heat exchangers are located in the relatively hot region of the convection zone; here, the heat exchanger 208 which serves for superheating saturated high-pressure steam 216 to give high-pressure steam 217 is again shown by way of example.

Similarly to the embodiment in FIG. 3, the gaseous hydrocarbon-containing feed 201 is introduced into the heat exchanger 203a at the relatively cold end of the convection zone for preheating. The regulating valve 222 is accordingly in the open position and the valve 223 is in the closed position. The preheated hydrocarbon-containing feed 212 is introduced as mixture 215 with superheated diluent steam 214 into the heat exchanger 207 for further preheating or superheating. This mixture is conveyed via further optional heat exchangers which are not shown directly into the radiation zone 218 for cracking.

The heat exchanger 203b in the region of relatively high flue gas temperature is bypassed here by means of a bypass. Accordingly, valve 225 is in the open position, while valve 226 is in the closed position. Thus, in this embodiment of the invention, too, the process in the convection zone is carried out in such a way that only a fraction of the heat transfer area available for preheating and/or vaporizing the hydrocarbon-containing feed is utilized. In the case of a gaseous hydrocarbon-containing feed 201, the entire heat exchanger 203b does not participate in heat exchange with the flue gas.

FIG. 6 shows the way in which the process is carried out in this embodiment of the invention in the case of a liquid hydrocarbon-containing feed 202. In this case, the valve 222 is accordingly closed and valve 233 is open. Here too, the liquid hydrocarbon-containing feed 202 is introduced into the heat exchanger 203a at the relatively cold end of the convection zone. However, unlike the way in which the process is carried out in the case of a gaseous hydrocarbon-containing feed 201, the preheated hydrocarbon-containing feed 224 is in this case fed into the heat exchanger 203b. The valve 226 is accordingly open, while valve 225 is closed. In the heat exchanger 203b, which is positioned at a position of relatively high flue gas temperature, the hydrocarbon-containing feed is heated further and/or vaporized 227 and only then diluted with superheated steam 214. Thus, in the case of a liquid hydrocarbon-containing feed 202, virtually 100% of the heat transfer area of the heat exchangers for preheating and/or vaporizing the hydrocarbon-containing feed is utilized. This ensures that the mixture of diluent steam and hydrocarbon-containing feed is, independently of the type and state of matter of the hydrocarbon-containing feed, fed under conditions which are optimized in process engineering terms (e.g. the desired entry temperature into the radiation zone) into the cracking tubes 218 for the cracking reaction and at the same time a high overall thermal efficiency of the cracking furnace (i.e. low flue gas output temperatures at the output from the convection zone) is achieved.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding German patent application DE 10 2012 008 038.7, filed Apr. 17, 2012, are incorporated by reference herein.

The invention claimed is:

1. A process for preparing hydrocarbons by thermally cracking a hydrocarbon-containing feed in a cracking furnace having a radiation zone and a convection zone, said process comprising:

thermally cracking said hydrocarbon-containing feed in said radiation zone wherein flue gas is generated, introducing said flue gas from said radiation zone into said convection zone as a heat transfer medium, preheating and/or vaporizing the hydrocarbon-containing feed in at least one heat exchanger arranged in the convection zone wherein the hydrocarbon-containing feed undergoes heat exchange with said flue gas, wherein the at least one heat exchanger for preheating and/or vaporizing the hydrocarbon-containing feed is positioned near a relatively cold end of the convection zone, heating and/or vaporizing boiler feed water in at least one heat exchanger arranged in the convection zone wherein the boiler feed water undergoes heat exchange with said flue gas, wherein said convection zone contains at least a first heat exchanger for heating and/or vaporizing boiler feed water and a second heat exchanger for heating and/or vaporizing boiler feed water, and both of said first and second heat exchangers for heating and/or vaporizing boiler feed water are positioned near a relatively hot end of the convection zone, wherein the temperature of said flue gas on exiting the convection zone varies, independently of the state of matter of the hydrocarbon-containing feed, in a range of 30° C. to less than 150° C. and wherein the streams in the heat exchangers of the convection zone are regulated in the process, depending on the state of matter of the hydrocarbon-containing feed, in the case of a gaseous hydrocarbon-containing feed, virtually 100% of the heat transfer area of all heat exchangers in the convection zone participates in heat exchange with said flue gas, and boiling feed water flows through both said first heat exchanger for heating and/or vaporizing boiler feed water and said second heat exchanger for heating and/or vaporizing boiler feed water, in the case of a liquid hydrocarbon-containing feed, only a fraction of 100% of the heat transfer area of the heat exchangers in the convection zone participates in heat exchange with said flue gas, and boiling feed water flows through only one of said first heat exchanger for heating and/or vaporizing boiler feed water and said second heat exchanger for heating and/or vaporizing boiler feed water.

2. The process as claimed in claim 1, wherein the flue gas has a temperature in the range from 80° C. to 150° C. on exiting from the convection zone.

3. The process as claimed in claim 1, wherein the flue gas has a temperature in the range from 80° C. to 130° C. on exiting from the convection zone.

4. The process as claimed in claim 1, wherein the one of said first and second heat exchangers for heating and/or vaporizing boiler feed water through which boiler feed water does not flow when said hydrocarbon-containing feed is liquid is bridged or bypassed by means of bypass regulation.

5. The process as claimed in claim 1, wherein said first heat exchanger for heating and/or vaporizing boiler feed water is connected hydrodynamically in series with said second heat exchanger for heating and/or vaporizing boiler feed water arranged in the convection zone, when said hydrocarbon-containing feed is liquid, boiler feed water is conveyed past said first heat exchanger for heating and/or vaporizing boiler feed water and flows through said second heat exchanger for heating and/or vaporizing boiler feed water, and when said hydrocarbon-containing feed is gaseous, boiler feed water flows first through said first heat exchanger for heating and/or vaporizing boiler feed water and then through said second heat exchanger for heating and/or vaporizing boiler feed water.

6. The process as claimed in claim 1, wherein diluent steam for cracking is superheated by means of at least one heat exchanger arranged in said convection zone when said hydrocarbon-containing feed is gaseous, and wherein this at least one heat exchanger does not participate, or participates with reduced efficiency, in heat exchange with the flue gas as a result of bypass regulation when said hydrocarbon-containing feed is liquid.

7. The process as claimed in claim 1, wherein the hydrocarbon-containing feed and/or the boiler feed water is uniformly preheated and/or vaporized.

8. The method according to claim 1, wherein a discharge line (10) said at least a first heat exchanger for heating and/or vaporizing boiler feed water is hydrodynamically connected to a boiler feed water feed line of said second heat exchanger for heating and/or vaporizing boiler feed water.

* * * * *